March 4, 1969 J. RANC 3,430,772
CONTINUOUSLY OPERATING CENTRIFUGAL FILTERS
Filed April 8, 1968
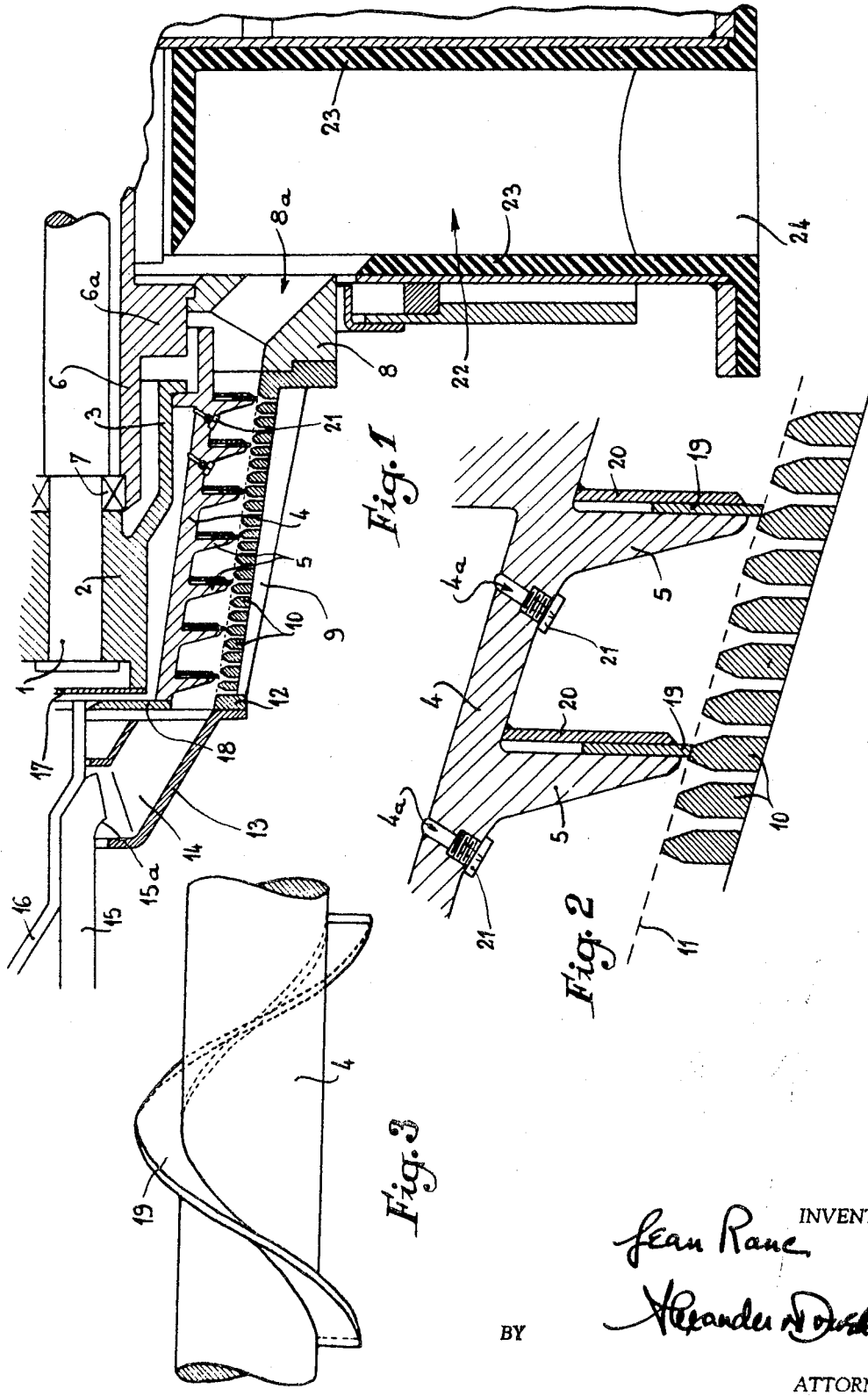

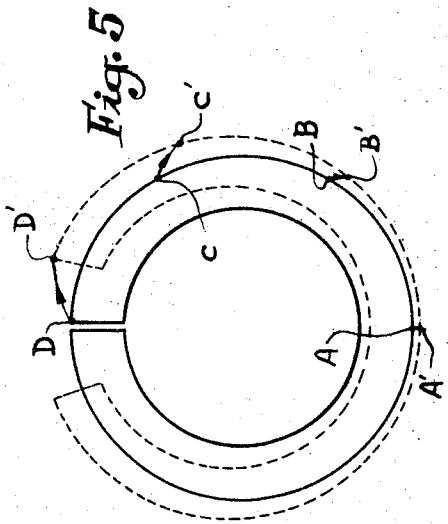
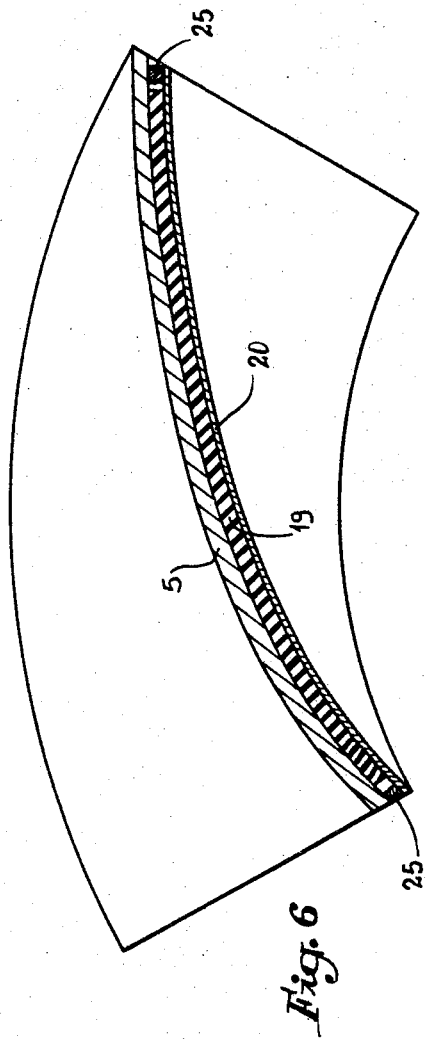
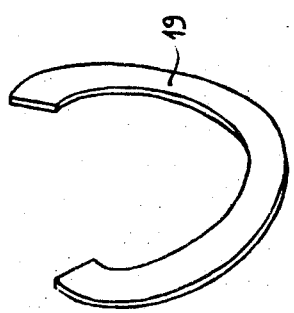

United States Patent Office 3,430,772
Patented Mar. 4, 1969

3,430,772
CONTINUOUSLY OPERATING CENTRIFUGAL FILTERS
Jean Ranc, Lyon, France, assignor to Robatel Slpi, Lyon (Rhone), France, a French joint-stock company
Continuation-in-part of application Ser. No. 591,239, Nov. 1, 1966. This application Apr. 8, 1968, Ser. No. 719,425
Claims priority, application France, Mar. 25, 1966, 47,095
U.S. Cl. 210—374      4 Claims
Int. Cl. B01d 33/06, 33/02, 33/00

ABSTRACT OF THE DISCLOSURE

In a centrifugal filter having an outer shell and an inner support which rotate at slightly different speeds, the inner support carrying helicoidal scraper or screw-threads to act on the solid layer formed on the inner periphery of the shell, the screw-threads carry helicoidal scraping pads made of a plastic material having a low coefficient of friction and extending continuously along the whole length of each convolution. These pads are mounted in guides associated with the screw-threads and in which they are freely slidable radially and angularly with respect to the axis of the inner support, being only retained by end stops which prevent them from becoming disengaged from their guides, somewhat in the manner of a split ring which would be disposed in a helical groove provided with end abutments to retain the ring.

Description

This application is a continuation-in-part of my prior copending U.S. patent application Ser. No. 591,239 filed Nov. 1, 1966 and now abandoned.

The present invention relates to continuously operating centrifugal filters of the kind comprising a frusto-conical filtering shell and a helicoidal or screw scraper adapted to act along the inner periphery of the shell, the latter and the scraper rotating at different speeds in order that the solids separated from the product being treated may be progressively and continuously advanced towards one end of the shell through which they are discharged.

A main object of the present invention is to reduce the wear of the screw scraper and of the shell, and at the same time to avoid that solid particles separated from the treated product, as for instance small crystals, may be crushed and broken between the scraper and the inner periphery of the shell.

It has already been proposed to provide a centrifugal filter of the kind in question with replaceable scraping pads made of light metal and which are radially guided on the screw-thread. The disadvantage of this arrangement is that each pad has necessarily a quite limited angular extension in order to bear regularly against the inner periphery of the filtering shell and that therefore the pads are separated from each other by slit-like clearances through which the separated solid material is forced, which tends to break or crush the small crystals which this material may contain. Furthermore the solid material which fills the clearances may jam the pads with respect to each other and thus impair proper operation of the machine. It is to be remarked that owing to the trapezoidal shape of the pads, these clearances increase as the pads wear out.

Another object of the present invention is to avoid these inconveniences.

In the centrifugal filter according to the present invention the helicoidal scrapers or screw-threads are provided with helicoidal scraping pads, preferably made of a wear-resistant plastic material having a low coefficient of friction, which extend continuously along the whole length of a convolution. These pads are mounted in guides associated to the screw threads and in which they are freely slidable radially and angularly with respect to the axis of rotation of the machine, being only retained by end stops which prevent them from becoming disengaged from their guides.

It will be understood that owing to the inherent flexibility of the plastic material, each pad acts somewhat in the manner of a resilient split ring which would have been disposed in a helicoidal groove provided with end abutments. The pad may thus bear regularly against the inner periphery of the filtering shell along the whole length of the convolution without having to be divided into a number of radially guided elements separated by slit-like clearances.

In the annexed drawings:

FIG. 1 is a fragmental longitudinal section of a continuously operating centrifugal filter according to this invention.

FIG. 2 is an enlarged view showing the details of the scraper and associated parts.

FIG. 3 is a quite simplified side view showing a helicoidal scraping pad mounted on a supposedly cylindrical drum.

FIG. 4 is a perspective view of the pad of FIG. 3.

FIG. 5 is an end view thereof illustrating the split-ring effect realized by the said pad owing to its inherent flexibility.

FIG. 6 is a development of the conical supporting drum of FIGS. 1 and 2 showing a convolution of the scraping arrangement with the movable pad associated thereto.

Referring to FIG. 1, the centrifuge comprises a main shaft 1 on which is mounted the hub 2 of a support 3. The latter carries a conical drum 4 on the outer periphery of which is fixed the helicoidal of screw scraper 5 of the machine.

Shaft 1 is surrounded by a hollow shaft 6 which is supported axially thereon by anti-friction bearings such as 7. Shaft 6 is formed with a supporting flange 6a on which is mounted an annular member 8 which forms the larger base of the perforated shell of the machine. For this purpose member 8 has outwardly directed perforations or conduits 8a for passage of the solid material scraped from the inner periphery of the shell. The latter itself comprises a number of uniformly spaced longitudinal bars 9 disposed along generatrices of a cone and which are connected with each other by means of annular bars 10 which form a supporting armature for a filtering wall or sieve 11 (see FIG. 2) adapted to retain solids from the product being treated and to cooperate with the screw scraper 5. The ends of bars 9 opposed to member 8 are secured to an annular plate 12.

Plate 12 supports a conical distributor 13 adapted to receive the product to be treated and to direct same towards the inner periphery of the shell 9–10, i.e. towards the filtering wall 11. The inner side of distributor 13 carries helicoidal vanes 14 whose ends nearest to the axis of rotation are curved in the form of a spoon.

The product to be treated is fed through a conduit 15 the downwardly curved end 15a of which opens close to the inner edge of the vanes 14 which are situated in the lower portion of distributor 13. With this conduit 15 is associated a tube 16 for the supply of washing liquid, this tube opening axially in front of the inner ends of shafts 1 and 6. Hub 2 carries a cover 17 to prevent access of the washing liquid into its inner space. The adjacent end of the scraper carrying drum 4 is also provided with a cover 18, but this cover has a central hole for free passage of tube 16 which thus opens into the space defined by the successive covers 17 and 18.

The turns or convolutions of the screw scraper 5 terminate short of the inner periphery of the filtering wall 11 (see FIG. 2) and each is equipped with a scraping pad 19 adapted to engage the said wall. Each pad is made of a wear-resistant plastic material having a low coefficient of friction and preferably of polytetrafluoroethylene, commercially known as Teflon. It is slidably mounted between the side of the convolution which faces the larger base of the filtering shell (right-hand side in FIG. 2) and a guiding plate 20 welded to the outer periphery of the supporting drum 4. Each convolution 5 is thus provided with a single pad 19 extending along its whole length (i.e. through 360° in the example shown) and this pad is wholly free between the convolution and the guide 20 associated thereto. It may thus slide radially and angularly with respect to drum 4. But its angular displacement (i.e. its rotation on drum 4) is limited by end stops not illustrated in FIGS. 1 and 2, but which will be discussed below with reference to FIG. 6, these stops closing the ends of the helicoidal slot defined between convolution 5 and guide 20 to accommodate pad 19.

With some of the convolutions of the screw scraper 5 are associated washing nozzles 21 fed with liquid from tube 16. Each nozzle 21 (FIG. 2) is directed obliquely towards the line of contact between the filtering wall 11 and the scraping pad 19 of the next convolution in the direction of the smaller base of the shell (and of the supporting drum 4). Nozzles 21 are formed with elongated outlet slits to produce substantially flat jets extending along the aforesaid line of contact. They may be provided in any suitable number and they may be mounted at any appropriate location on the periphery of drum 4. But they are preferably disposed close to the base of a convolution of the screw scraper so as to act on the string-like mass of solid material advanced by the pad 19 of the next convolution. They receive the washing liquid through perforations 4a provided in the wall of drum 4.

The conduits 8a provided in member 8 (for the discharge of the solid material scraped from the filtering wall 11) open into an annular collecting chamber 22 which surrounds the larger base of the centrifuge. The walls of chamber 22 are coated with a thick layer 23 of rubber or of a similar soft and resilient material. Chamber 22 has a lower outlet 24.

In operation shafts 1 and 6 are driven at slightly different speeds in the conventional manner, in order that the screw scraper 5 may slowly rotate with respect to the filtering wall 11 in such a direction as to advance the solid material towards the larger base of the shell, i.e. towards member 8 and conduits 8a.

The product to be treated (generally a liquid containing solid particles in suspension) is continuously fed through conduit 15. It is immediately caught by the ends of the vanes 14 which accelerate it progressively, whereby any shock is avoided at the inlet end of the filtering sleeve. The suspension is then submitted to the action of centrifugal force within the rotating shell and it is therefore applied against the filtering wall 11. The liquid phase of the suspension permeates through wall 11 and it is collected within a casing not illustrated, while the solid phase is retained and forms a layer which is continuously scraped and advanced by the pads 19 of the screw scraper 5 towards the discharge conduits 8a, pads 19 acting in this respect as a screw conveyor. The washing liquid is fed through tube 16 into the space or chamber defined by covers 17 and 18. It is driven into rotation by the inner periphery of drum 4 and owing to the action of centrifugal force it thus issues under pressure through nozzles 21 in the form of flat jets which impinge on the string-like mass of solid material which is formed on the advancing side of the pads 19 which faces the larger base of the shell.

Owing to their inherent flexibility pads 19 are expanded and uniformly applied in continuous physical contact against the filtering wall 11 by centrifugal force along their whole length, thereby preventing any ingress of solid particles between their outer edge and the said wall, without any intermediate slit-like clearance through which the solid material might be forced.

The operation of the pads 19 will be better described with reference to FIGS. 3 to 6.

In FIGS. 3 to 5 the relatively small conicity of drum 4 has been neglected and same has been illustrated as cylindrical. FIG. 3 shows in side view the shape of a scraping pad 19 for a scraping convolution extending through 360° as this is often the case in such centrifugal filters. FIG. 4 illustrates in perspective the pad alone (drum 4 being omitted). FIG. 5 is an end view showing that pad 19 operates more or less as a split ring. The representation in full lines corresponds to the profile of the pad in the absence of centrifugal force. Under the action of the latter pad 19, which is inherently flexible, expands as shown in dash lines and it is clear that it may thus come into continuous physical contact with the inner periphery of the filtering wall 11 of FIGS. 1 and 2. It is to be remarked that this expansion of pad 19 is accompanied not only with an obvious radial displacement of same between convolution 5 and guide 20 (see FIG. 2), but also with an angular displacement of some at least of the portions of the pad. Assuming for instance (FIG. 6) that the middle point thereof moves only radially from A to A' while remaining at the same angular position on the supporting drum, it may be seen that the other points follow non-radial paths as indicated for instance at BB', CC' and DD'. It is therefore essential that the pad may slide between convolution 5 and guide 19 not only radially, but also angularly with respect to drum 4.

It is obvious that the above explanations given with reference to a cylindrical drum, are also valid for the conical drum 4 of FIGS. 1 and 2.

The helicoidal scraping pad 19 should of course be prevented from becoming disengaged from the drum by "unscrewing," i.e. by bodily rotating as a whole with respect to drum 4. This is easily obtained by limiting the angular freedom of the pad by means of appropriate abutments or stops 25, as indicated in FIG. 6. This figure illustrates the development of the conical drum 4 with a convolution 5, the corresponding pad 19 and its guiding plate 20 being shown in section. Pad 19 is freely slidable in the slot or groove defined by convolution 5 and guiding plate 20. It may slide radially to the drum (i.e. perpendicularly to the plane of the drawing) and angularly thereto (i.e. longitudinally of convolution 5), but its possible displacement in the latter direction is limited by two abutments or stops 25 which close the ends of the said slot. Referring to FIG. 5, the possible longitudinal motion of pad 19 in its guides is such that any point thereof may follow the non-radial paths illustrated for instance at DD'.

Stops 25 may be removable, if desired, to facilitate replacements of pads 19.

The solid material issuing from conduits 8a is thrown by centrifugal force against the walls of the collecting chamber 22, but owing to the resilient layer 23 the impact is dampened and in the case of crystals the latter are not liable to break into minute particles.

What I claim is:

1. In a continuously operating centrifugal filter of the kind comprising a rotating shell having an inner periphery, an inner support co-axial to said shell and rotating at a slightly different speed, said support having helicoidal screw-threads which terminate short of the inner periphery of said shell, and scraping pads carried by said screw-threads and radially slidable with respect to same, the improvement according to which each of said pads is made of a flexible plastic material having a low coefficient of friction, extends in continuous form along the whole length of a convolution of said screwthreads and is slidable along one of said screw-threads angularly of said support, said support further comprising means to limit the angular displacement of each of said pads on said support, and means to mount said pads for angular and radially slidable movement.

2. In a centrifugal filter as claimed in claim 1, said support being formed with helical guiding slots each extending along one of said screw-threads to slidably receive one of said scraping pads, and said means to limit the angular displacement of said pads on said support comprising stops closing the ends of each of said slots.

3. In a centrifugal filter as claimed in claim 2, each of said guiding slots being defined by one of said screwthreads and by a guiding plate secured to said support in spaced parallel relation to one of said screw-threads.

4. In a centrifugal filter as claimed in claim 1 said scraping pads being made of polytetrafluoroethylene.

References Cited

UNITED STATES PATENTS

| | | | |
|---|---|---|---|
| 1,655,426 | 1/1928 | Laughlin | 210—374 |
| 1,828,548 | 10/1931 | Shapley | 210—374 |
| 2,283,457 | 5/1942 | Pecker | 210—374 |

REUBEN FRIEDMAN, *Primary Examiner.*

J. L. DeCESARE, *Assistant Examiner.*

U.S. Cl. X.R.

210—380